United States Patent
Dannerbauer et al.

(10) Patent No.: US 10,495,219 B2
(45) Date of Patent: Dec. 3, 2019

(54) HIGH DRIVABILITY CONTROL FOR CVT TRACTORS

(71) Applicant: CNH Industrial America LLC, New Holland, PA (US)

(72) Inventors: Harald Dannerbauer, St. Valentin (AT); Gabriele Morandi, Modena (IT)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/564,175

(22) PCT Filed: Mar. 30, 2016

(86) PCT No.: PCT/EP2016/056846
§ 371 (c)(1),
(2) Date: Oct. 3, 2017

(87) PCT Pub. No.: WO2016/156347
PCT Pub. Date: Oct. 6, 2016

(65) Prior Publication Data
US 2018/0119807 A1    May 3, 2018

(30) Foreign Application Priority Data
Apr. 3, 2015    (IT) .............................. MO2015A0075

(51) Int. Cl.
*F16H 61/462*    (2010.01)
*B60W 10/06*     (2006.01)
*B60W 10/101*    (2012.01)
*F16H 61/47*     (2010.01)
(Continued)

(52) U.S. Cl.
CPC ........... *F16H 61/462* (2013.01); *B60W 10/06* (2013.01); *B60W 10/101* (2013.01); *B60W 20/19* (2016.01); *B60W 30/19* (2013.01); *F16H 61/47* (2013.01); *B60W 2300/152* (2013.01); *B60W 2710/0644* (2013.01); *B60W 2710/0661* (2013.01)

(58) Field of Classification Search
CPC ...... B60W 20/19; B60W 10/06; B60W 30/19; B60W 10/101; B60W 2300/152; B60W 2710/0661; F16H 61/47; F16H 61/462
See application file for complete search history.

(56) References Cited

U.S. PATENT DOCUMENTS

2010/0043419 A1\* 2/2010 Nomura ................. B60K 17/10
                                                        60/328
2014/0121917 A1\* 5/2014 Davis .................... F16H 61/462
                                                        701/54

(Continued)

*Primary Examiner* — Stacey A Fluhart
(74) *Attorney, Agent, or Firm* — Rickard K. DeMille; Rebecca L. Henkel

(57) ABSTRACT

A method for providing a high drivability control system for an agricultural or industrial vehicle having an engine and a continuously variable transmission (CVT) includes setting a maximum speed target (MST), and setting a vehicle speed percentage (VSP) according to input using a desired speed input. A target engine speed, a target rate of change of the engine speed, a target CVT ratio, and a target rate of change of the target CVT ratio is then calculated from the VSP, the MST, and the present engine speed. The target engine speed may be further calculated from the present vehicle speed and/or the present CVT ratio.

13 Claims, 8 Drawing Sheets

(51) Int. Cl.
*B60W 20/19* (2016.01)
*B60W 30/19* (2012.01)

(56) References Cited

U.S. PATENT DOCUMENTS

2015/0369261 A1* 12/2015 Ries .................. F16H 61/42
                                                         60/327
2016/0280222 A1*  9/2016 Ono .................. B60K 6/12

* cited by examiner

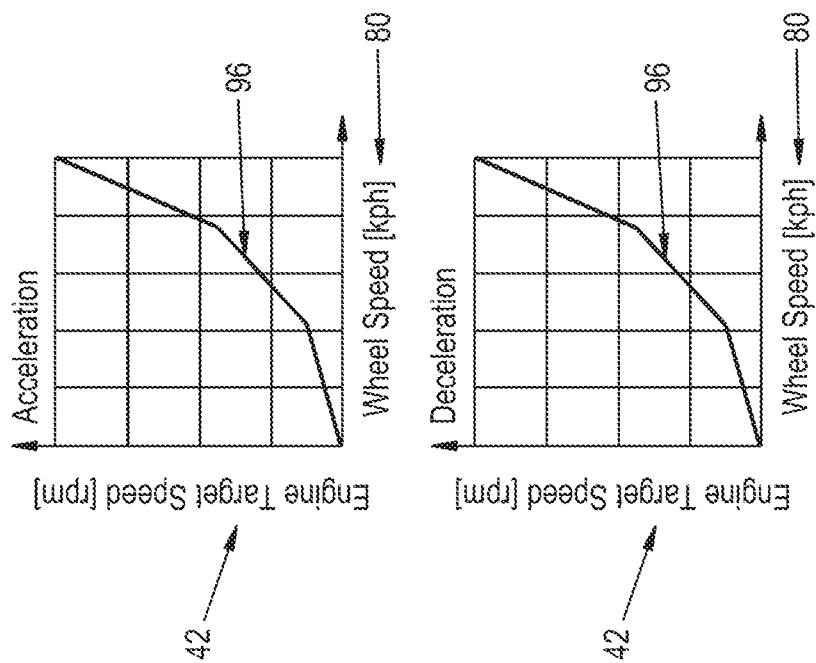
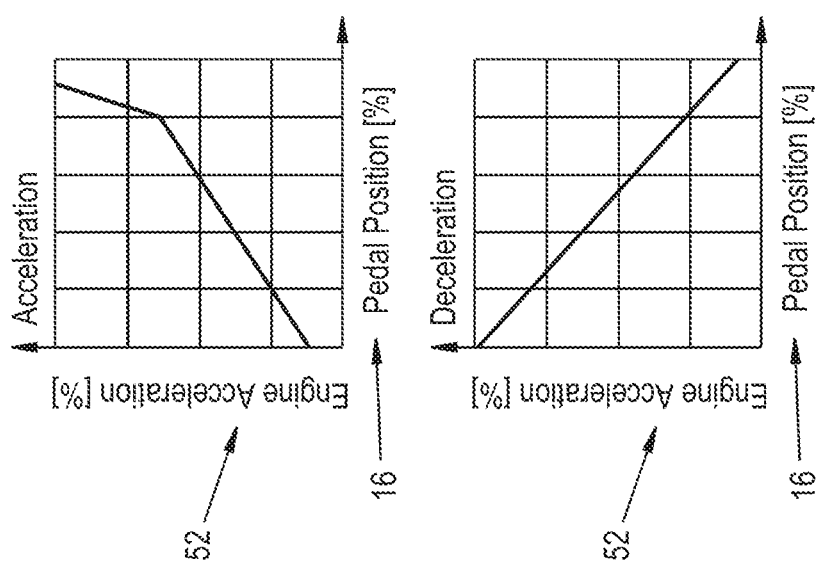
Fig. 4B
Fig. 4A

HIGH DRIVABILITY CONTROL FOR CVT TRACTORS

CROSS REFERENCE TO RELATED APPLICATIONS

This application claims the benefit of priority of PCT Application No. PCT/EP2016/056846, filed Mar. 30, 2016, which claims the benefit of Italian Application No. MO2015A000075, filed Apr. 3, 2015, the entirety of each of which is incorporated herein by reference.

PRIORITY CLAIM

This application claims the benefit of priority of PCT Application No. PCT/EP2016/056846, filed Mar. 30, 2016, which claims the benefit of Italian Application No. MO2015A000075, filed Apr. 3, 2015, the entirety of each of which is incorporated herein by reference.

BACKGROUND OF THE INVENTION

The present invention relates to vehicles having a continuously variable transmission (CVT), known also as an infinitely variable transmission, and more specifically to agricultural and industrial vehicles having a CVT, and even more specifically to tractors having a CVT.

Agricultural and industrial vehicles can take many forms, such as backhoe loaders, wheel loaders, forestry fellers, skidders, harvesters, sprayers, application equipment, utility vehicles, agricultural tractors, and compact tractors. Often, these agricultural and industrial vehicles are required to perform tasks at low speeds with a high amount of tractive output, typically off-road, under which circumstances the range of speeds involved are all under a comparatively low limit, and under which circumstances a significant variation of the control pedal or lever corresponds to a small variation of the vehicle speed. These same agricultural and industrial vehicles may then be required to travel on-road at relatively high speeds, wherein the range of speeds involved are under a significantly higher limit, and under which circumstances a small variation of the control pedal or lever corresponds to a significant variation of the vehicle speed.

In a traditional on-road vehicle, such as a car or truck, the vehicle speed is controlled by varying the application of the throttle and by varying the transmission ratio. In an on-road vehicle having a manual transmission, the vehicle speed is controlled within the range of speeds for a selected gear by such application of the throttle. In an on-road vehicle having an automatic transmission, the vehicle speed is controlled over its entire range of speeds by such application of the throttle, with the transmission selecting and engaging the appropriate gear according to the velocity and the commanded acceleration. In a traditional agricultural or industrial vehicle, however, for example a tractor, the operator selected a transmission gear and set the throttle for a given speed, which did not largely vary once the clutch was engaged. A greater amount of tractive effort could then be achieved by application of a lower gear and a higher throttle setting, with the operator making such selections. In other words, in on-road vehicles, the engine is typically controlled in torque, whereas in agricultural and industrial off-road vehicles, the engine is typically controlled in speed.

Infinitely variable transmissions allow the selection of any transmission ratio within a given range. Infinitely variable transmissions operate on various principles, including variable diameter pulleys, toroidal CVTs, and hydrostatic CVTs. In agricultural and industrial vehicles, hydrostatic CVTs dominate due to their ability to transmit a great amount of torque. In a traditional agricultural or industrial vehicle having a manually controlled CVT, the operation of the vehicle was not entirely dissimilar from operating a manual transmission agricultural or industrial vehicle with a clutch. That is to say, the throttle was typically set to a given engine speed, commonly referred to as engine revolutions per minute (ERPM), and the vehicle speed was varied using a lever or a drive pedal that operated the CVT.

More advanced agricultural or industrial vehicles have an automatically controlled CVT, sometimes paired with a geared transmission, and an automatically controlled ERPM. Such vehicles having an automatically controlled CVT and an automatically controlled ERPM are known for example from EP 1 156 942 B1. In this configuration, the operator changes the desired vehicle speed by using the lever or the drive pedal. A CVT controller then accomplishes the desired vehicle speed by modifying both the ERPM and the CVT output ratio. The CVT controller does this by sending an ERPM request signal to an Engine Control Module (ECM) by way of a Controller Area Network (CAN) bus. In an agricultural or industrial vehicle having a CVT paired with a geared transmission, the CVT controller may further manage the geared transmission ratio using electro-valves controlling clutches, synchronizers, and the pump volume of the hydrostatic unit.

Even with advanced agricultural or industrial vehicles having a CVT with an automatically controlled transmission ratio and automatically controlled ERPM (AutoMode), certain difficulties can arise with the responsiveness of the vehicle to the operator's intentions. Particularly, not only do the range of speeds and acceptability of speed variation differ between use off-road and use on-road, but the expected response in terms of acceleration and deceleration to lever or drive pedal position changes differs under these varied circumstances.

What is needed in the art is a system that provides for improved drivability and better correlation between an operator's inputs and the operator's expected responses from the agricultural or industrial vehicle in terms of speed and acceleration or deceleration.

SUMMARY OF THE INVENTION

The present invention provides for a control strategy of the engine and the transmission of a vehicle, for example an agricultural or industrial vehicle, that improves the drivability and the correlation between an operator's inputs and the operator's expected responses from the agricultural or industrial vehicle in terms of speed and acceleration or deceleration.

The invention in one form is directed to a method for providing a high drivability control system for a vehicle having an engine and an infinitely variable transmission. The method includes providing at least one desired speed input for example using a pedal, a multi-function handle, or lever, for controlling the speed of the vehicle. The method further includes providing at least one Electronic Control Module for the infinitely variable transmission and engine, or providing two separate control modules, one being an infinitely variable transmission control module and another being an ECM. The high drivability control system sets a maximum speed target and sets a vehicle speed percentage according to an operator input using the at least one desired speed input. The high drivability control system may then calculate a target rate of change of the engine speed from the vehicle speed percentage. The high drivability control system then calculates a target engine speed from the current engine speed, the maximum speed target, and the target rate of change of the engine speed, if applicable. The high drivability control system then calculates a target rate of change of the infinitely variable transmission ratio from the vehicle speed percentage, and a target infinitely variable transmission ratio from the current infinitely variable transmission ratio and the target rate of change of the infinitely variable transmission ratio.

An advantage of the present invention is that it provides for improved drivability and better correlation between an operator's inputs and the operator's expected responses from the agricultural or industrial vehicle in terms of speed and acceleration or deceleration.

Another advantage is that drive pedal resolution becomes predictable and manageable, even when selected speed ranges vary significantly.

Another advantage is that the invention provides for both speed control of the agricultural or industrial vehicle and pseudo torque control of the engine.

Another advantage is that the invention provides for fluid vehicle acceleration or deceleration despite output ratio discontinuities when the continuously variable transmission is paired with a geared transmission.

Another advantage is that the invention provides for predictable slowing and stopping when the speed input, for example the drive pedal, drive lever, or multi-function handle is decreased or set to zero.

BRIEF DESCRIPTION OF THE DRAWINGS

The above-mentioned and other features and advantages of the invention, and the manner of attaining them, will become more apparent and the invention will be better understood by reference to the following description of embodiments of the invention taken in conjunction with the accompanying drawings, wherein:

FIG. 4A is a graphical illustration of engine acceleration related to pedal position during acceleration according to an embodiment of the invention;

FIG. 4B is a graphical illustration of engine acceleration related to pedal position during deceleration according to an embodiment of the invention;

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

The terms "continuously variable transmission" or "infinitely variable transmission," "engine," "drive wheels," and "handle" are used principally throughout this specification for convenience but it is to be understood that these terms are not intended to be limiting. Thus, "continuously variable transmission" or "infinitely variable transmission" refers to a CVT of the type described above, but should not be construed as limiting and may represent any variable ratio connection between a power supply and a motion output, such as wheels. "Engine" refers to an internal combustion engine, but should not be construed as limiting and may represent an external combustion engine, an electric, hydraulic, or pneumatic, or other rotational power producing device. "Drive wheels" refers to round wheels, but again, they should not be construed as limiting and may represent tracks or other ground running tractive devices. The terms "handle," "knob," "scroll," "button," and "switch" each refers to a manipulatable device, and is equally not to be construed as limiting. Furthermore, embodiments illustrated are primarily agricultural vehicles. However, this also is not to be construed as limiting, as the principles to which this disclosure is directed may be embodied on any ground travelling vehicle, and such ground travelling vehicle may fall within the limits of the appended claims.

Figure 1:
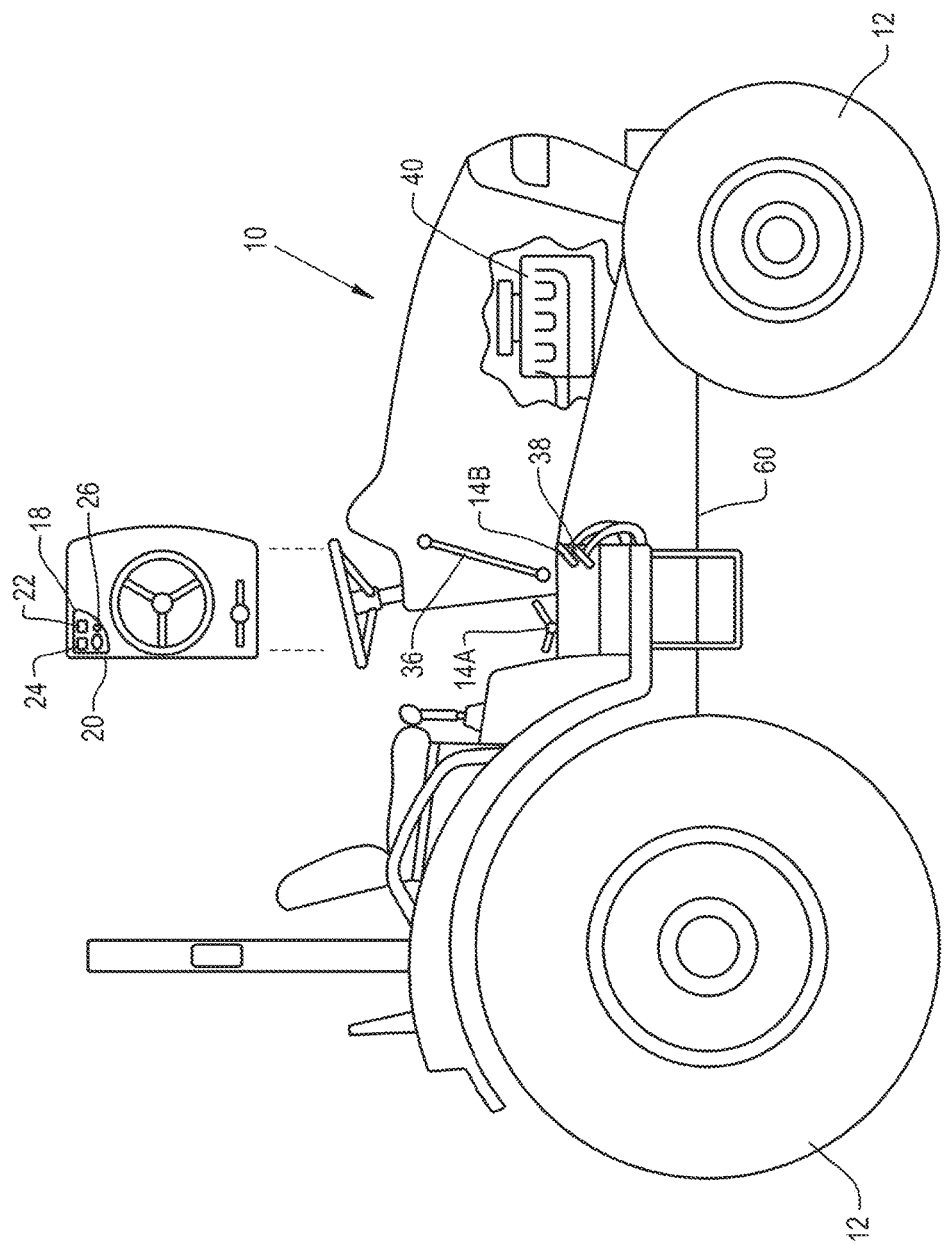
FIG. 1 is a side view of an embodiment of an embodiment of an agricultural or industrial vehicle in the form of a tractor.

Referring now to the drawings, and more particularly to FIG. 1, there is shown an agricultural or industrial vehicle 10 in the form of a tractor. The agricultural or industrial vehicle 10 is provided with at least one set of drive wheels 12, an engine 40, and a CVT 60. A desired speed input 38 in the form of a drive lever 36 or at least one drive pedal 14 is used by an operator to input a desired Vehicle Target Speed (VST) 28. A multi-function handle 18 is provided with a rotatable knob 20, referred to here as a scroll, a hare button 22, a turtle button 24, and a speed control 26.

Figure 2:
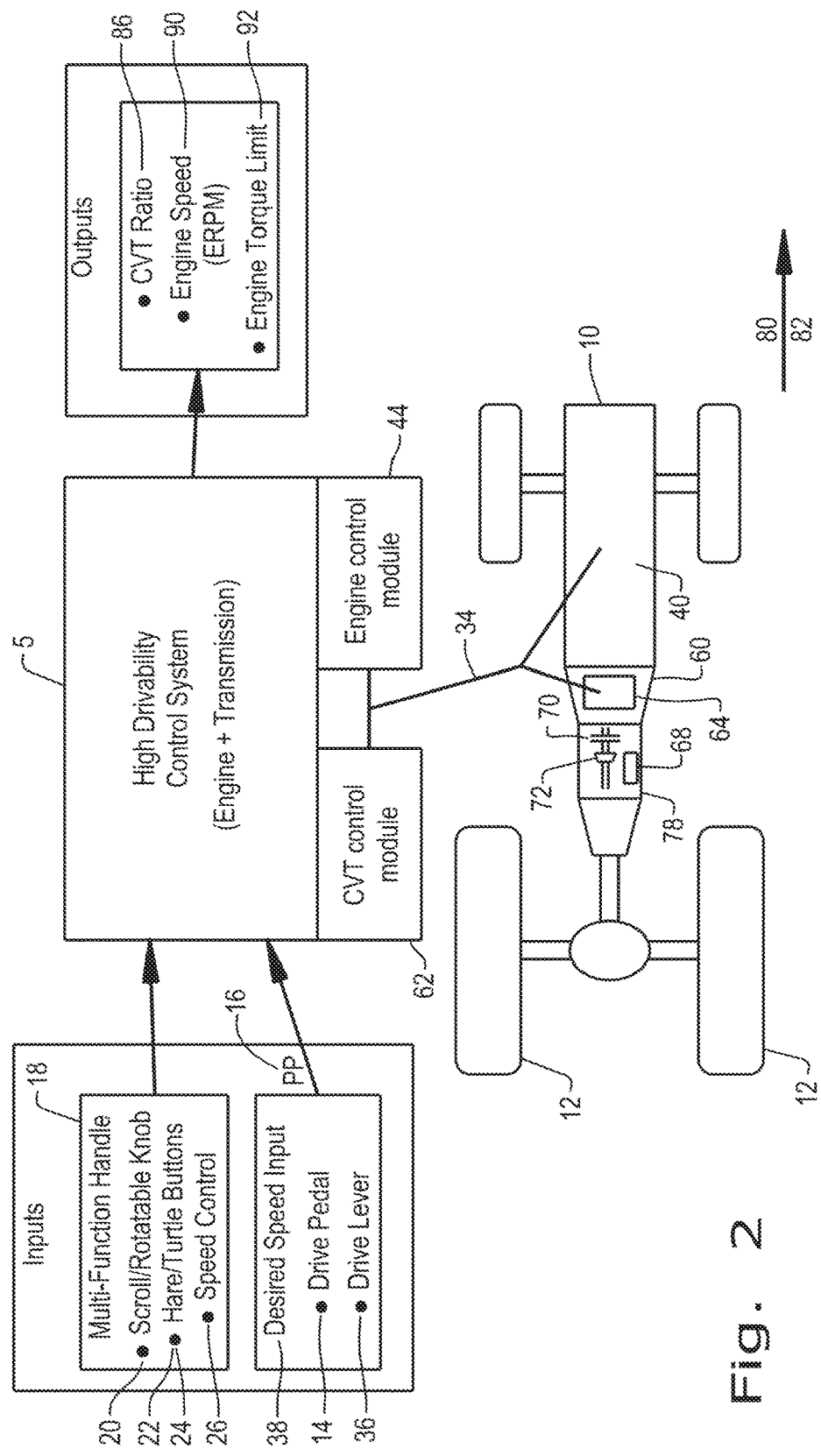
FIG. 2 is a graphical representation of an embodiment of the invention, a high drivability control system for an agricultural or industrial vehicle.

Now, additionally referring to FIG. 2, there is shown and illustrated a graphical representation of an embodiment of the invention, a high drivability control system 5 for an agricultural or industrial vehicle 10. The agricultural or industrial vehicle 10 itself is represented in simplified form at the bottom of FIG. 2, having at least one pair of drive wheels 12, an engine 40, and a CVT 60. Operator inputs are represented graphically as a multi-function handle 18 and a desired speed input 38. The desired speed input 38 may be embodied as at least one drive pedal 14 or as a drive lever 36, or both. The at least one drive pedal 14 may be embodied as a single pedal, a single rocker pedal 14A having both forward and reverse function, or may be embodied in two separate drive pedals 14B, one for forward and one for reverse. The multi-function handle 18 is provided with a rotatable knob or scroll 20, a hare button 22, a turtle button 24, and a speed control 26. The rotatable knob or scroll 20, the hare button 22, the turtle button 24, or the speed control 26, or any combination thereof, may be usable by the operator to set a Maximum Speed Target (MST) 30, or the maximum vehicle speed that can be achieved by fully depressing the at least one drive pedal 14. Alternately, the high drivability control system 5 may set the MST independently of operator input. For transport operations, this MST 30 may be, for example, 50 kilometers per hour. For tillage applications, this MST 30 may be, for example, 5 kilometers per hour. The at least one drive pedal 14 is then used to output a Pedal Position (PP) 16 to set a Vehicle Speed Percentage (VSP) 32, which is a percentage of the MST 30, and which together are interpreted by the high drivability control system 5 to set the VST 28.

The high drivability control system 5 may utilize a CVT control module 62 and an ECM 44, which are connected to each other and to the engine 40 and to the CVT 60 by way of a CAN bus 34. To accomplish the VST 28, the high drivability control system 5 causes the CVT control module 62 to send a requested transmission ratio signal 66 to the CVT 60, and causes the ECM 44 to send a requested ERPM signal 46 to the engine 40. Alternately, a single combined control module may be utilized. Further, other types of interconnection between the module or modules and the engine and CVT may be used, such as Ethernet, serial ports, or wireless connections. The CVT 60 responds to the requested transmission ratio signal 66 by causing a hydrostatic unit 64 to output a given transmission ratio which becomes the present CVT ratio 86. In an embodiment where the CVT 60 is paired with a geared transmission 78, the CVT control module 62 may further cause the electrovalves 68, the clutches 70, and the synchronizers 72 to change gears, resulting in the output of the present transmission ratio 86. The engine 40 responds to the requested ERPM signal 46 by outputting a given ERPM 90 which becomes the present ERPM 90. Together, the output of the present ERPM and the present transmission ratio 86 results in the desired vehicle speed 80 and the vehicle acceleration or deceleration 82.

In an agricultural or industrial vehicle in AutoMode, with an automatically controlled CVT and an automatically controlled ERPM, the vehicle speed is simply the product of the ERPM and the CVT output ratio:

$$\omega_{vehicle} = r \cdot \omega_{engine}$$

The vehicle acceleration/deceleration is thus:

$$\dot{\omega}_{vehicle} = \dot{r} \cdot \omega_{engine} + \omega_{engine} \cdot \dot{r}$$

Where:
r is the actual CVT output ratio,
$\dot{\omega}_{engine}$ is the rate of change of the ERPM,
$\omega_{engine}$ is the actual ERPM,
$\dot{r}$ is the rate of change of the CVT output ratio.
The CVT output ratio perturbs the ERPM in two ways:
During the CVT output ratio variation, the acceleration or deceleration of the vehicle mass produces a variation of the engine torque.
A variation of the CVT output ratio leads to a variation of the equivalent inertia seen by the engine.

For these reasons, and in order to avoid that the two controls be in antiphase, the CVT output ratio control is typically slower than the ERPM control. This means that the main fast speed variation depends on the ERPM control. In general, the rate of change of the CVT output ratio depends upon ERPM. Today the ERPM and the CVT output ratio are controlled to achieve the same VST 28 the same way for different MST 30 and VSP 32 combinations. For example, a VST 28 of 10 kilometers per hour can be set by the operator by setting a MST 30 of 10 kilometers per hour and a VSP 32 of 100%, or by setting a MST 30 of 50 kilometers per hour and a VSP 32 of 20%. As the at least one drive pedal 14 resolution is different for both situations, this results in poor reactiveness, at least in one of the two situations. For a high MST 30, for example, the resolution of the at least one drive pedal 14 will be lower. For a high MST 30, therefore, a small movement of the at least one drive pedal will lead to a high variation of the VST 28, which causes bad drivability, especially at low vehicle speeds.

An inventive aspect of the present invention, therefore, relates not only the target ERPM 42 to the VSP 32 and/or MST 30, but also the target rate of change 52 of the ERPM 42 to the VSP 32 and possibly to the present CVT ratio 86 and/or, to the present vehicle speed 80. Particularly, during vehicle acceleration, the target rate of change 52 of the ERPM 42 is higher when the VSP 32 is high. During vehicle deceleration, the target rate of change 52 of the ERPM 42 is higher when the VSP 32 is low. In depressing the at least one drive pedal 14, the operator will increase both the VST 28 and the target rate of change 52 of the ERPM 42, resulting in speed control of the agricultural or industrial vehicle 10 plus pseudo torque control of the engine 40. This is because a higher VSP 32 will result in greater engine acceleration, similar to on-road vehicles, which typically have torque controlled engines, as mentioned previously. The engine 40, therefore, sees an equivalent inertia of the agricultural or industrial vehicle 10 that depends both on the mass of the agricultural or industrial vehicle 10 and on the present CVT ratio 86, as follows: $J \propto Mr^2$. This means that for low present CVT ratios 86 the acceleration capability of the engine 40 is higher, such that the engine 40 is controlled to low target rates of change 52 of the target ERPM 42 in order to improve drivability.

A further inventive aspect of the present invention deals with the gear changes in an embodiment where the CVT 60 is paired with a geared transmission 78. During acceleration and deceleration, it is desirable to minimize the derivative of acceleration or deceleration with respect to time, i.e. —the rate of change of acceleration, or "jerk." During gear changes, the gradient in final output ratio 96 may experience discontinuities, resulting in transient fast variations in acceleration or deceleration, or "jerks." In order to have a fluid vehicle acceleration or deceleration, the engine 40 is controlled in such a way as to compensate for the variation of the acceleration due to these discontinuities. In particular, the transition from one gear to another gear within the geared transmission 78 is controlled to take place around a final output ratio 96 that can be achieved with either gear using the output ratio 86 of the CVT 60 to compensate, in order to avoid such final output ratio 96 discontinuities. The process of shifting gears within the geared transmission 78 requires a certain amount of time, during which the final output ratio 96 has only limited variation. In this condition, the final output ratio 96 does not increase or decrease significantly during the gear shift itself. In order to maintain fluid vehicle acceleration or deceleration, the engine 40 is controlled in such a way as to compensate for the lack of available ratio variation, which is called "Ratio Stuck." This strategy, therefore, further includes linking the target ERPM 42 to the actual vehicle speed 80, so that when the non-linearity of the final output ratio 96 of the CVT 60 and of the geared transmission 78 occurs and no ratio variation is immediately possible, the present ERPM 90 is not at its minimum or maximum. Therefore, the target ERPM 42 can be increased or decreased in order to get the target vehicle acceleration or deceleration 82 despite the discontinuity, as follows:

$$\dot{\omega}_{vehicle} = \dot{r} \cdot \omega_{engine} + \omega_{engine} \cdot \dot{r} \rightarrow \dot{\omega}_{vehicle} = \dot{r} \cdot \omega_{engine}$$

A similar Ratio Stuck condition may occur in an agricultural or industrial vehicle 10 having a CVT 60 that is not paired with a geared transmission 78. In this case, the Ratio Stuck condition occurs when the CVT 60 has reached an upper or lower bound of its available ratios, and continued acceleration or deceleration is being commanded by the operator through the desired speed input 38. The high drivability control system 5 minimizes the derivative of acceleration or deceleration under these conditions by ensuring that the present ERPM 90 is not at its maximum or minimum prior to the CVT 60 reaching its upper or lower bound of its available ratios during acceleration or deceleration, respectively. Upon occurrence of the Ratio Stuck condition at the point where the CVT 60 does reach its upper or lower bound of available ratios, the high drivability control system 5 again increases or decreases the target ERPM 42 in order to obtain the target vehicle acceleration or deceleration 82 despite the discontinuity, within the limits of available ERPM 42.

This is particularly relevant during deceleration of the agricultural or industrial vehicle 10, because the effect of an interruption in the deceleration leads to the operator feeling that the agricultural or industrial vehicle 10 is not stopping according to his or her desired speed input 38. When the operator is depressing the at least one drive pedal 14 and then suddenly releases or sets to zero the at least one drive pedal 14, he or she wants an immediate and continuous feeling of deceleration. For this reason, the minimum present ERPM 90 is only allowed to be reached when the agricultural or industrial vehicle 10 is at a standstill. During acceleration, for example, the present ERPM 90 is lower than the target ERPM 42, while during deceleration the present ERPM 90 tends to be higher than the target ERPM 42. In order to ensure immediate deceleration, as soon as a request for deceleration is detected, the target ERPM 42 is immediately made to be equal or lower than the present ERPM 90.

Further embodiments of the present invention correlate the PP 16, the VSP 32, the MST 30, and the target rate of change 52 of the target ERPM 42 to accomplish the following VST 28 changes:

When accelerating and when the operator "floors" the at least one drive pedal 14, or sets the VSP 32 close to 100%, then the operator expects high responsiveness, and the target rate of change 52 of the target ERPM 42 and the target CVT ratio 74 is controlled accordingly.

When accelerating and when the operator pushes the at least one drive pedal 14 gently, e.g.—for inching operations, or sets the VSP 32 equal to or less than about 20%, then the operator expects low responsiveness, and the target rate of change 52 of the target ERPM 42 and the target CVT ratio 74 is controlled accordingly.

When decelerating and when the operator decreases the at least one drive pedal 14 from almost 100% to zero, this is an indication that the operator wants the agricultural or industrial vehicle 10 to coast and thus a slow reaction is expected. The target rate of change 52 of the target ERPM 42 and the target CVT ratio 74 is controlled accordingly.

When decelerating and when the operator decreases the at least one drive pedal 14 from a very light depressed state to zero, this is an indication that the operator wants to slow the agricultural or industrial vehicle 10 to a standstill fast and thus a high responsiveness is required. The target rate of change 52 of the target ERPM 42 and the target CVT ratio 74 is controlled accordingly.

Either when decelerating and when the operator decreases the at least one drive pedal 14 from almost 100% to zero, or when decelerating and when the operator decreases the at least one drive pedal 14 from a very light depressed state to zero, initiation of deceleration is immediate. As soon as the request for deceleration is detected, the target ERPM 42 is set to equal or lower than the present ERPM 90.

Figure 3:
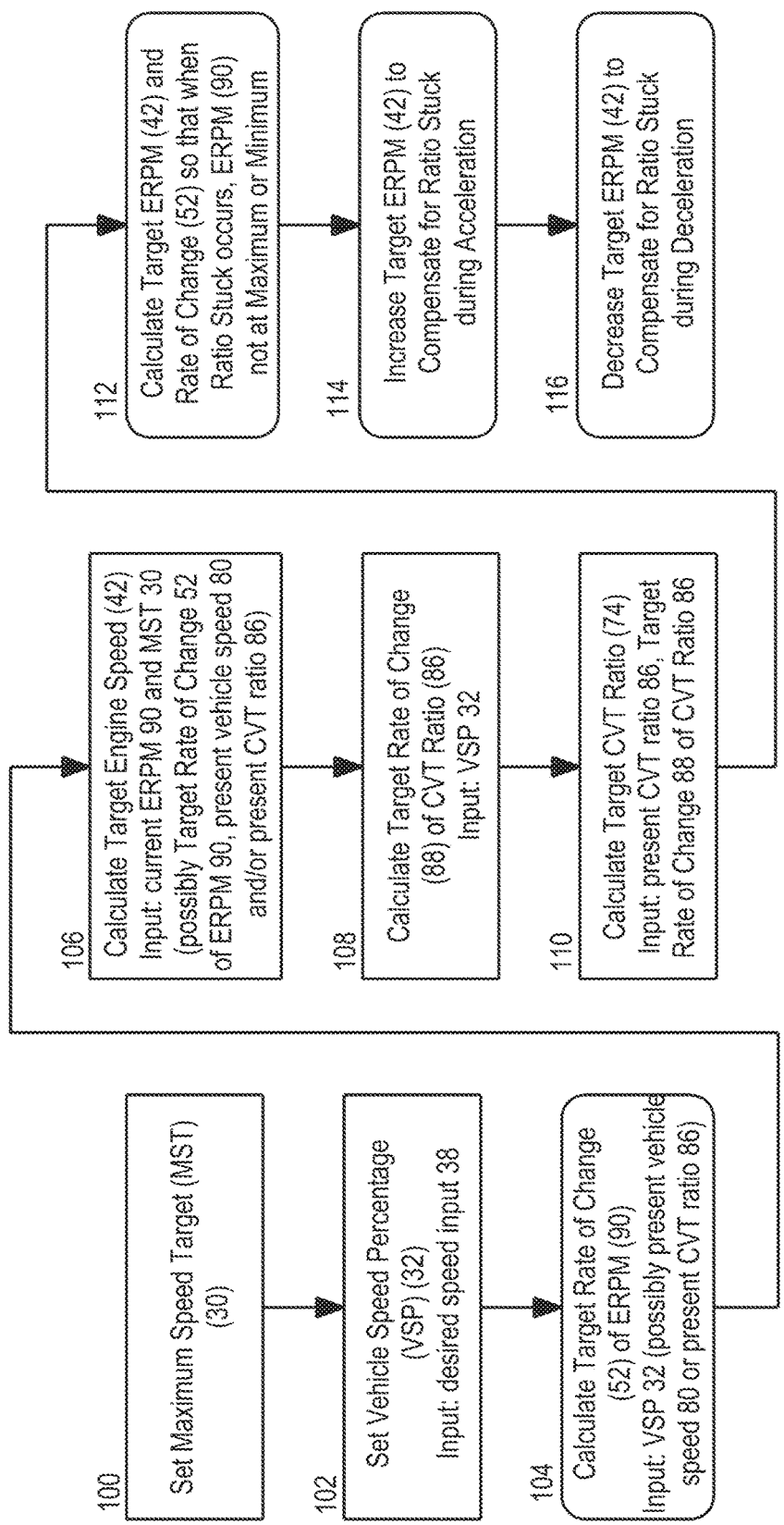
FIG. 3 is a flow chart showing the series of steps taken in the functioning of an embodiment of the invention.

Turning now to FIG. 3, a flow chart shows the series of steps taken in the functioning of an embodiment of the invention. In step 100, the high drivability control system 5 sets the MST 30, which may be according to operator inputs using the device for controlling a range of available speeds 18, or which may be done by the high drivability control system 5 without operator input. In step 102, the high drivability control system 5 sets the VSP 32 according to operator inputs using the desired speed input 38. In optional step 104, the high drivability control system 5 calculates the target rate of change 52 of the engine speed 90 using the values of the VSP 32 and possibly the present vehicle speed 80 and/or the present CVT ratio 86. In step 106, the high drivability control system 5 calculates the target engine speed 42 using the current engine speed 90 and the MST 30, and possibly the target rate of change 52 of the engine speed 90, the present vehicle speed 80 and/or the present CVT ratio 86. In step 108, the high drivability control system 5 calculates the target rate of change 88 of the CVT ratio 86 using the value of the VSP 32. In step 110, the high drivability control system 5 calculates the target CVT ratio 74 using the present CVT ratio 86 and the target rate of change 88 of the CVT ratio 86.

In step 112, the high drivability control system 5 determines that a "Ratio Stuck" condition is impending as the engine 40 is nearing its maximum or minimum ERPM 90. This may be in an embodiment with an infinitely variable transmission (60) not paired with a geared transmission (78), wherein the infinitely variable transmission (60) is nearing the upper or lower limit of its available ratios (86). Alternately, this condition may occur in an embodiment having an infinitely variable transmission (60) paired with a geared transmission (78), wherein the geared transmission 78 must shift in order for the vehicle 10 to continue accelerating or decelerating. The high drivability control system 5 then limits the target engine speed 42 and target rate of change 52 of the engine speed 90 to less than the maximum operating ERPM if accelerating and to more than the minimum ERPM if decelerating, prior to occurrence of the Ratio Stuck condition. In steps 114 and 116, once the Ratio Stuck condition occurs, the high drivability control system 5 increases the target engine speed 42 and target rate of change 52 of the engine speed 90 to compensate for the Ratio Stuck condition if accelerating, and decreases the target engine speed 42 and target rate of change 52 of the engine speed 90 to compensate for the Ratio Stuck condition if decelerating.

Turning now to FIGS. 4A through 8, certain relationships are illustrated between engine acceleration /deceleration 52 and pedal position 16, between engine target speed 42 and vehicle (or wheel) speed 80, between present CVT ratio 86 and final output ratio 96, between final output ratio 96 and time, and between final output ratio 96, engine target speed 42, vehicle speed 80, and time. Particularly, FIG. 4A shows a form of pseudo torque control according to one embodiment of the invention relating engine acceleration and deceleration to the pedal position, such that during vehicle acceleration, the engine acceleration 52 is higher when the VSP 32 or PP 16 is high, and that during vehicle deceleration, the engine acceleration 52 is lower when the VSP 32 or PP 16 is low. FIG. 4B shows engine speed based on vehicle speed feedback according to another embodiment of the invention, such that at low final output ratios 96, the engine is controlled in a smoother way, with a proportionally large change in vehicle or wheel speed 80 being accomplished with a proportionally small rate of change in engine target speed 42, and such that as the final output ratio increases, the amount of rate of change in engine target speed 42 in proportion to the amount of change in vehicle or wheel speed 80 increases.

Figure 5:
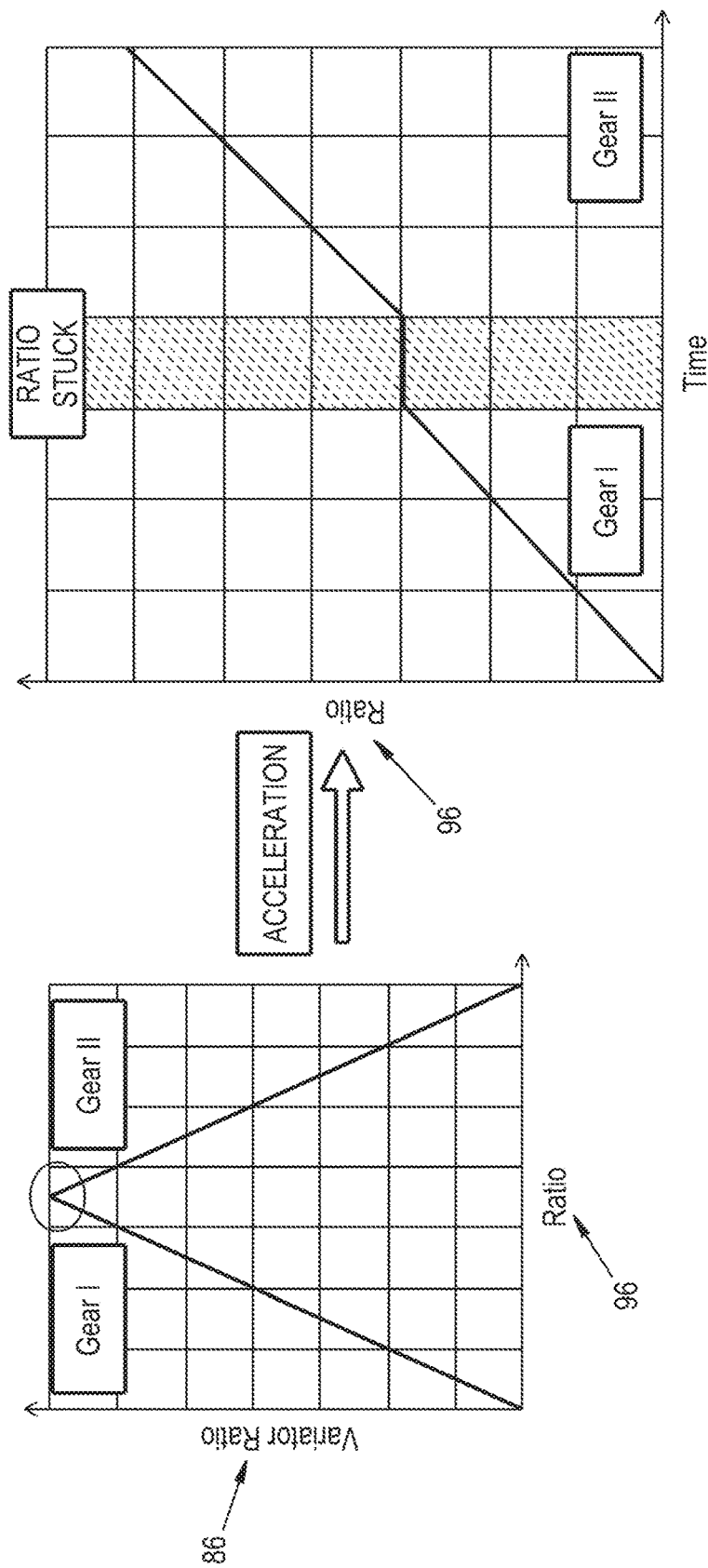
FIG. 5 is a graphical illustration of the occurrence of "ratio stuck" during acceleration.
Figure 6:
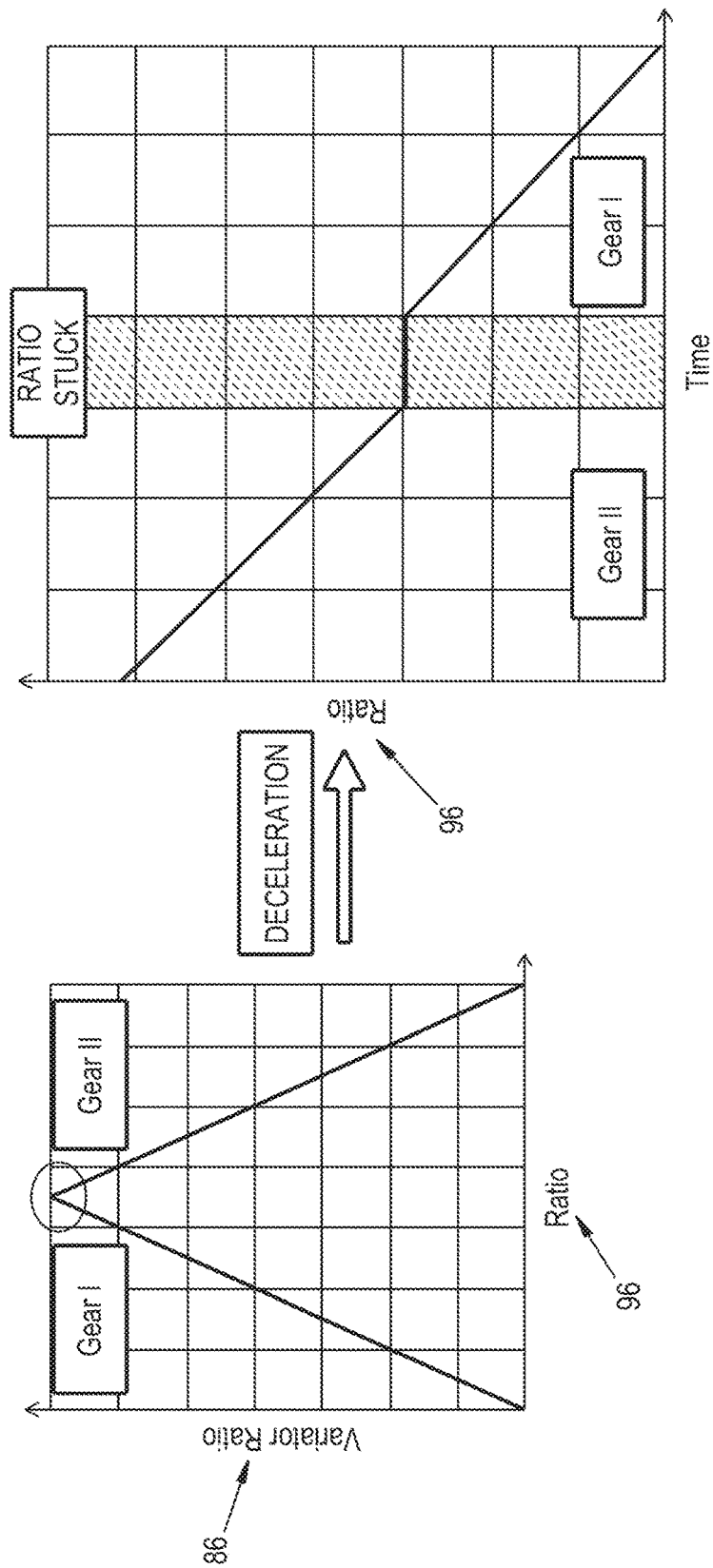
FIG. 6 is a graphical illustration of the occurrence of "ratio stuck" during deceleration.
Figure 7:
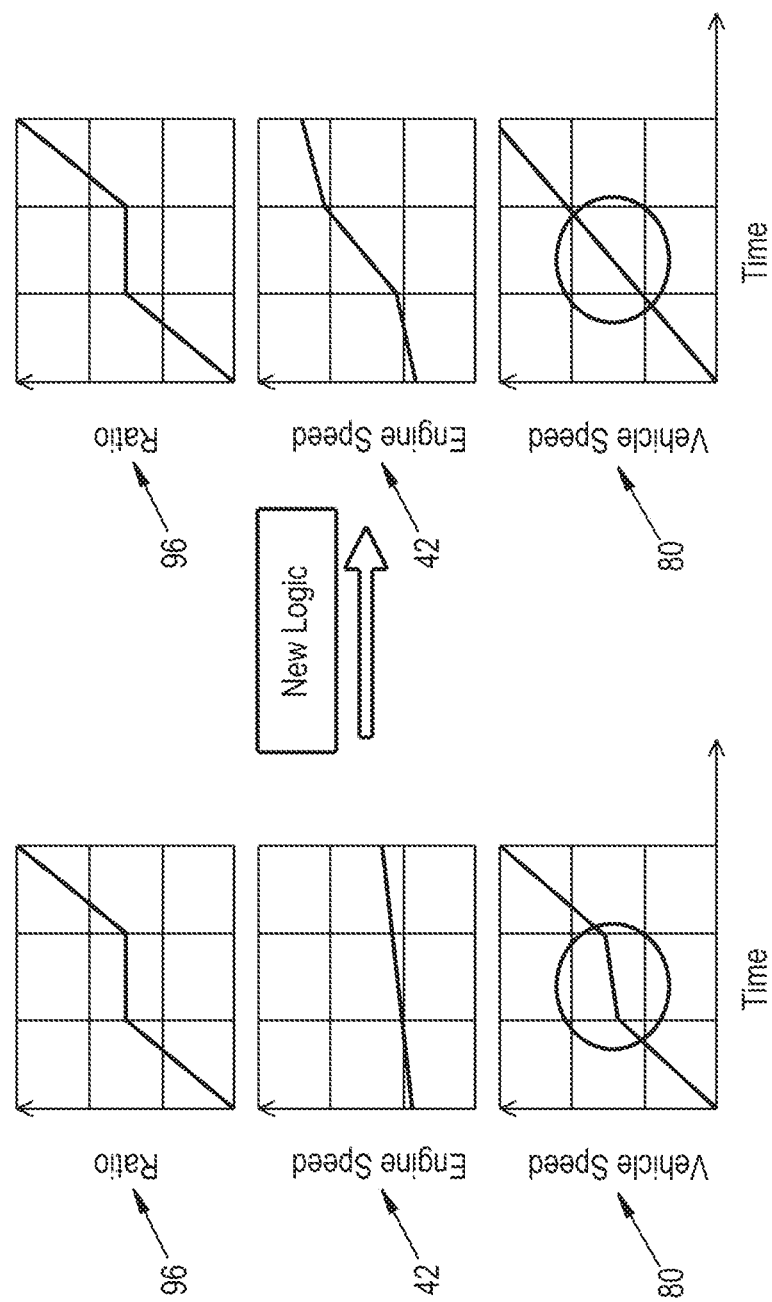
FIG. 7 is a graphical illustration of the relationship between the final output ratio 96, the engine target speed 42, the vehicle speed 80, and time in an accelerating agricultural or industrial vehicle not having an embodiment of the invention as compared to an accelerating agricultural or industrial vehicle having an embodiment of the invention.
Figure 8:
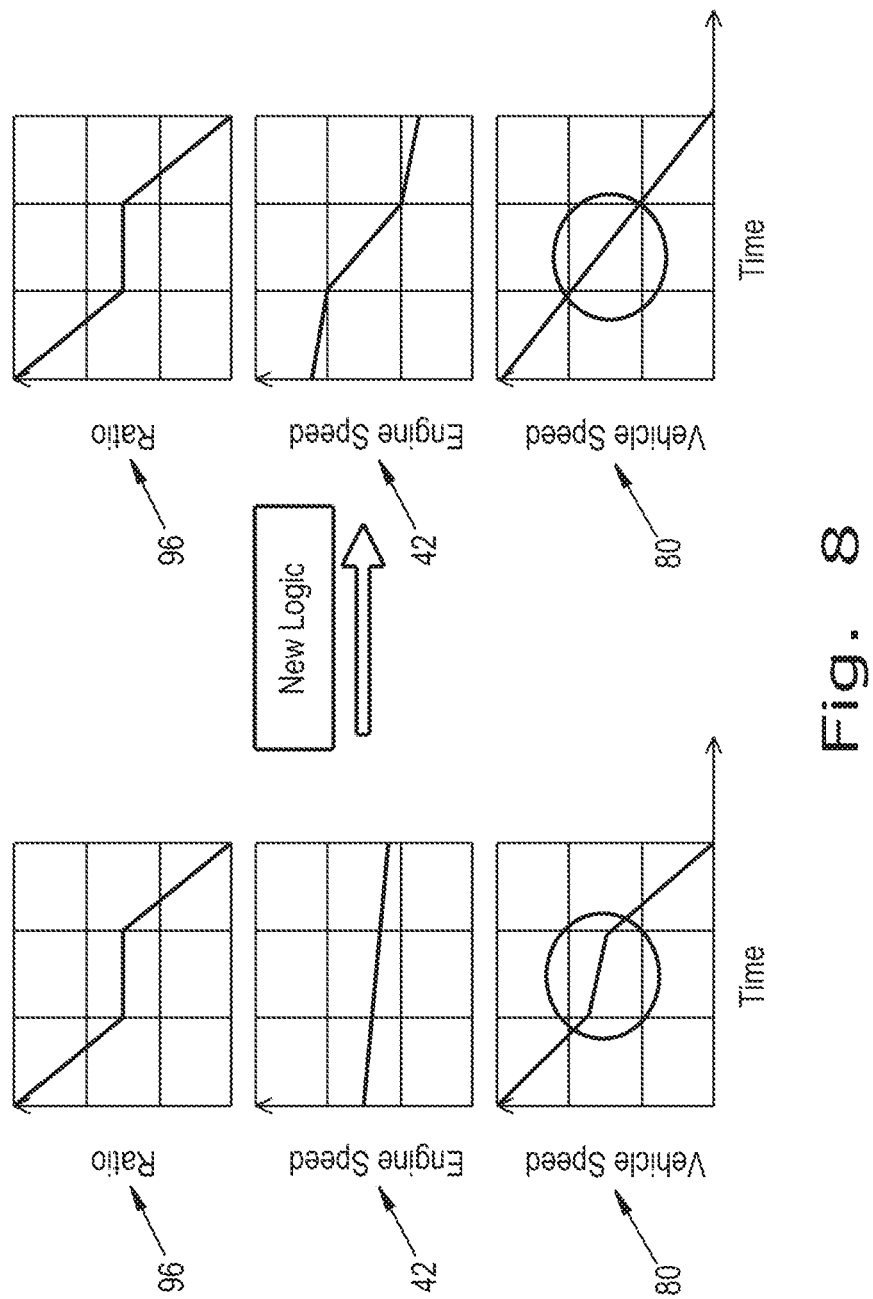
FIG. 8 is a graphical illustration of the relationship between the final output ratio 96, the engine target speed 42, the vehicle speed 80, and time in a decelerating agricultural or industrial vehicle not having an embodiment of the invention as compared to a decelerating agricultural or industrial vehicle having an embodiment of the invention.

FIGS. 5 and 6 show the occurrence of "ratio stuck," such that as the geared transmission changes from gear 1 to gear 2, there is a period of time where the CVT cannot compensate. Particularly, the CVT ratio 86 is shown as a function of the final output ratio 96 in the condition of shifting from gear 1 to gear 2, and the final output ratio 96 is shown as a function of time. FIG. 5 shows the occurrence of "ratio stuck" during vehicle acceleration, and FIG. 6 shows the occurrence of "ratio stuck" during vehicle deceleration. FIGS. 7 and 8 show on the left hand side the relationship between final output ratio 96, engine target speed 42, vehicle speed 80, and time in an agricultural or industrial vehicle not having an embodiment of the invention wherein the engine 40 is controlled in such a way as to compensate for the variation in the rate of increase or decrease in the final output ratio 96 due to the geared transmission changes from gear to gear. On the right hand side of FIGS. 7 and 8 are shown the relationship between final output ratio 96, engine target speed 42, vehicle speed 80, and time in an agricultural or industrial vehicle having an embodiment of the invention wherein the engine 40 is controlled in such a way as to compensate for the variation in the rate of increase or decrease in the final output ratio 96 due to the geared transmission changes from gear to gear. Note that the engine target speed 42 increases or decreases during the discontinuity in final output ratio 96 at a greater rate, so that the rate of vehicle speed 80 increase or decrease remains continuous. This minimizes discontinuities in acceleration or deceleration, or "jerks," in the encircled areas.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A method of providing a control system for a control system for a vehicle having an engine and an infinitely variable transmission, comprising the steps of:
   providing at least one desired speed input for controlling the speed of said vehicle;
   providing at least one control module for controlling a current output ratio of said infinitely variable transmission and for controlling a current speed of said engine;
   setting a maximum vehicle speed target;
   setting a vehicle speed percentage according to operator input using said at least one desired speed input;
   calculating a target engine speed from a current speed of said engine and said maximum vehicle speed target;
   calculating a target rate of change of said output ratio of said infinitely variable transmission from said vehicle speed percentage; and
   calculating a target infinitely variable transmission output ratio from said current output ratio of said infinitely variable transmission and said target rate of change of said output ratio of said infinitely variable transmission.

2. The method for providing a control system of claim 1, further comprising the step of:
   calculating a target rate of change of an engine speed from said vehicle speed percentage; and
   further calculating said target engine speed from said target rate of change of said engine speed.

3. The method for providing a control system of claim 2, wherein:
   said target rate of change of said engine speed being further calculated from one of a present vehicle speed and said current output ratio of said infinitely variable transmission.

4. The method for providing a control system of claim 2, further comprising the steps of:
   calculating said target engine speed and said target rate of change of said engine speed such that when any non-linearity of said current output ratio of said infinitely variable transmission occurs, said current engine speed is not at a maximum or minimum operating engine speed; and
   increasing or decreasing said target rate of change of said engine speed to compensate for said non-linearity of said current output ratio of said infinitely variable transmission upon occurrence of said non-linearity of said current output ratio of said infinitely variable transmission during acceleration or deceleration of said vehicle, respectively.

5. The method for providing a control system of claim 4, wherein:
   said non-linearity of said current output ratio of said present infinitely variable transmission occurs when said current output ratio of said infinitely variable transmission is at a maximum before said engine speed is at said maximum.

6. The method for providing a control system of claim 4, further comprising the steps of:
   pairing said infinitely variable transmission with a geared transmission;
   further calculating said target engine speed and said target rate of change of said engine speed such that when any non-linearity of a current output ratio of said geared transmission occurs, said current engine speed is not at maximum or minimum; and
   increasing or decreasing said target rate of change of said engine speed to compensate for said non-linearity of said current output ratio of said geared transmission upon occurrence of said non-linearity of said current output ratio of said geared transmission during acceleration or deceleration of said vehicle, respectively.

7. The method for providing a control system of claim 6, wherein:
   said non-linearity occurs during a gear shift of said geared transmission.

8. The method for providing a control system of claim 1, wherein:
   said target engine speed is further calculated from one of a present vehicle speed and said current output ratio of said infinitely variable transmission.

9. The method for providing a control system of claim 1, wherein:
   a device is provided for controlling a range of available speeds of said vehicle, said device being one of a multi-function handle and a default value in software within said at least one control module.

10. The method for providing a control system of claim 1, wherein:
   said maximum speed target has a range of between 0 and 80 kilometers per hour.

11. The method for providing a control system of claim 1, wherein:
   said at least one control module further comprises a infinitely variable transmission control module for controlling said infinitely variable transmission and an engine control module for controlling said engine.

12. The method for providing a control system of claim 1, wherein:
   said at least one desired speed input is one of a drive lever, a single pedal, a single rocker drive pedal, and a pair of forward and reverse drive pedals.

13. The method for providing a control system of claim 1, further comprising the steps of:
   providing said infinitely variable transmission with a hydrostatic unit.

* * * * *